(12) United States Patent
Ziemski

(10) Patent No.: US 8,098,261 B2
(45) Date of Patent: Jan. 17, 2012

(54) PILLARBOXING CORRECTION

(75) Inventor: Gerard Ziemski, Garden Bay (CA)

(73) Assignee: Apple Inc., Cupertino, CA (US)

(*) Notice: Subject to any disclaimer, the term of this patent is extended or adjusted under 35 U.S.C. 154(b) by 299 days.

(21) Appl. No.: 11/516,182

(22) Filed: Sep. 5, 2006

(65) Prior Publication Data

US 2008/0055314 A1 Mar. 6, 2008

(51) Int. Cl.
- *G09G 5/00* (2006.01)
- *G09G 5/02* (2006.01)
- *H04N 3/20* (2006.01)
- *H04N 5/46* (2006.01)

(52) U.S. Cl. ......... 345/611; 345/589; 348/173; 348/556

(58) Field of Classification Search .................. 345/619, 345/501, 558, 559, 611; 348/589, 556, 173; 715/808, 867
See application file for complete search history.

(56) References Cited

U.S. PATENT DOCUMENTS

| | | | | | |
|---|---|---|---|---|---|
| 4,670,784 | A | * | 6/1987 | Goldberg | 348/556 |
| 4,782,383 | A | * | 11/1988 | Isnardi | 375/240.25 |
| 5,193,006 | A | * | 3/1993 | Yamazaki | 348/173 |
| 5,291,295 | A | * | 3/1994 | Srivastava | 348/805 |
| 5,642,474 | A | * | 6/1997 | Parkhurst et al. | 358/1.18 |
| 5,689,717 | A | * | 11/1997 | Pritt | 715/234 |
| 7,440,006 | B2 | * | 10/2008 | Lin et al. | 348/173 |
| 2005/0093850 | A1 | * | 5/2005 | Mori et al. | 345/204 |
| 2005/0140674 | A1 | * | 6/2005 | Li et al. | 345/428 |
| 2008/0001971 | A1 | * | 1/2008 | Kouninski | 345/635 |

* cited by examiner

*Primary Examiner* — Aaron M Richer
*Assistant Examiner* — Robert Craddock
(74) *Attorney, Agent, or Firm* — Fish & Richardson P.C.

(57) ABSTRACT

A display control device used to govern non-content regions in a display space, and selectively determine data for display in the non-content regions is described. The display control device can identify the non-content regions, and determine types of data that can be filled in the non-content regions. Once determined, the fill data can be presented in the non-content regions concurrently with an image frame.

18 Claims, 9 Drawing Sheets

200

500

```
┌─────────────────────────────────┐
│ Determine Display Property      │
│ Information And Content         │
│ Information                     │
│ 502                             │
└─────────────────────────────────┘
              ↓
┌─────────────────────────────────┐
│ Identify Display Area And Fill  │
│ Area                            │
│ 504                             │
└─────────────────────────────────┘
              ↓
┌─────────────────────────────────┐
│ Determine Fill Data For Display │
│ In The Fill Area                │
│ 506                             │
└─────────────────────────────────┘
```

Figure 5

PILLARBOXING CORRECTION

TECHNICAL FIELD

This invention relates to methods and systems for displaying content on a display device.

BACKGROUND

Portable electronic media players, such as small portable digital music and video players, have become increasingly popular with consumers. Music jukeboxes, such as the Apple iPod®, available from Apple Inc., from Cupertino, Calif. allow consumers to store and play video and audio files of different formats. Other functionalities include the ability to record audio sound (e.g., human voices) or capture video content (e.g., movies). Due to their smallsize, portable players provide users the flexibility, versatility and convenience to replay stored video and audio data at virtually anywhere and at anytime.

Video content can be formatted and optimized for a particular type of display. Some video content can be optimized in accordance with an aspect ratio of a display on which the content is to be displayed. Aspect ratio is the ratio between the width and the height of a display used to play the video content. If the aspect ratio for which the video content is optimized matches the aspect ratio of the display device, then the entire display space of the display can be utilized for displaying the video content. Conversely, if the aspect ratio for which the video content is optimized differs from that of the display device, only a portion of the display space can be utilized for displaying the video content.

SUMMARY

Systems, methods, computer-readable mediums, user interfaces and other implementations are disclosed for governing non-content regions in a display space of an image frame, and selectively determine data for display in the non-content regions so as to enhance viewing experience of the image frame being displayed. The non-content regions can first be identified in each frame. The identification process can include identifying dimensions and locations of the non-content regions that have no active video content. The space occupied by non-content regions can be determined after a display area is established. The identification process may be followed by a determination of types of data that can be filled in the non-content regions. The types of fill data can include, but are not limited to, data associated with movie enhancing effects, video related information, and user provided data. A display control device can be used to facilitate the determination of the non-content regions and data to be fill therein.

In some implementations, a method of enhancing visual effects includes: identifying one or more regions of a display space being displayed in a current frame by a display device, each region being a non-content region; evaluating display device information selected from a group of content displayed in the display space or property information associated with the display device; determining fill data to be displayed in the one or more regions of the display space based on the evaluated display content; and displaying the fill data in each non-content region.

In some implementations, a method of enhancing visual effects includes: defining a display space including a display area and a fill area, the display area displaying a current frame of video content; identifying one or more regions of the display area; determining color data associated with the one or more regions of the display area; and applying the color data for display in the fill area.

In some implementations, a display control device includes: a fill area identification module for identifying one or more non-content regions of a display space in an image frame; a display area identification module for identifying one or more content regions in the image frame; and a fill data module for identifying fill data to be displayed in the one or more non-content regions.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is an exemplary process for displaying content on a display device.

Like reference symbols in the various drawings indicate like elements.

DETAILED DESCRIPTION

System Overview

Figure 1A:
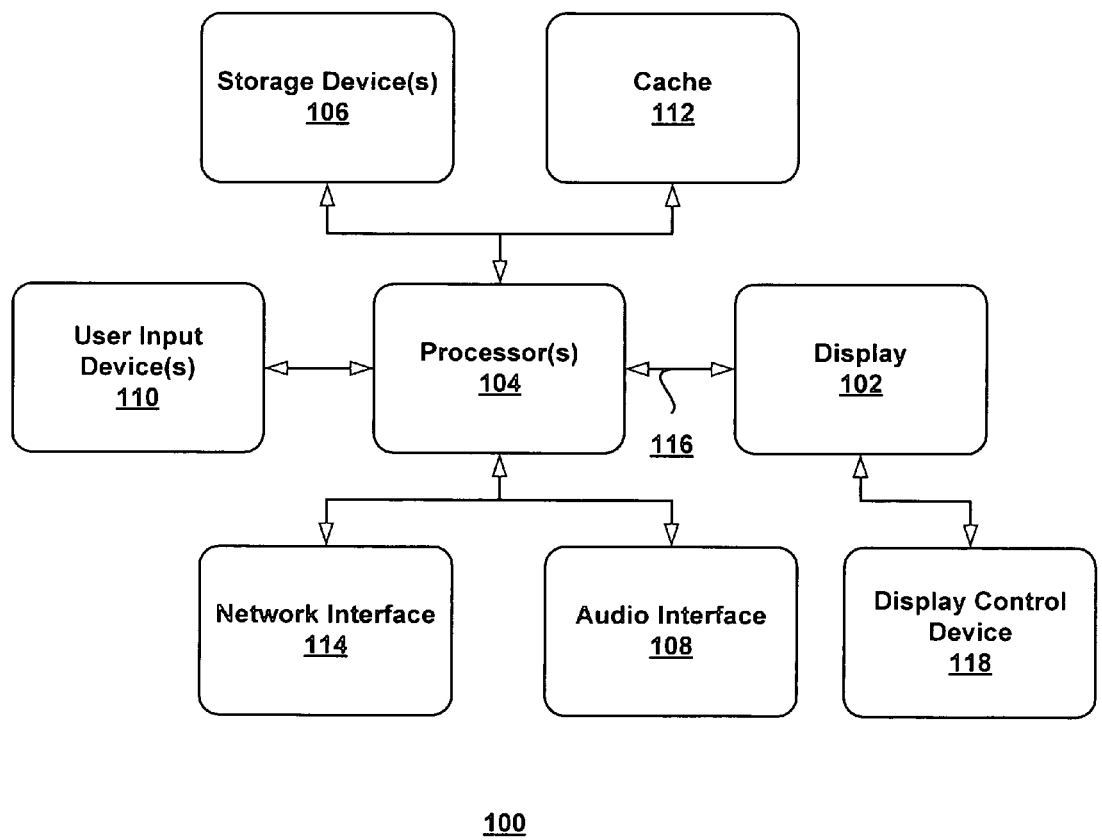
FIG. 1A illustrates a block diagram of an exemplary media player.

FIG. 1A illustrates a block diagram of an exemplary media player 100. A Media player as used herein refers to any software, or sets of executable instructions, hardware, or combinations thereof that are operable to visibly and/or audibly communicate media data to an end-user using a visual/audio output device. Media data can include one or more of, by way of example, video data, audio data, graphical data, text data, image data, and the like.

In some implementations, the media player 100 can be or be included in a personal computer, notebook computer, mobile phone, portable audio/video player, personal digital assistant (PDA), video recorder, digital camera, or other handheld or portable consumer electronic devices. For the purpose of brevity and not by way of limitation, the media player 100 will be described in the context of a portable computing device dedicated to processing audio soundtracks, still images, video clips or movies.

Figure 1B:
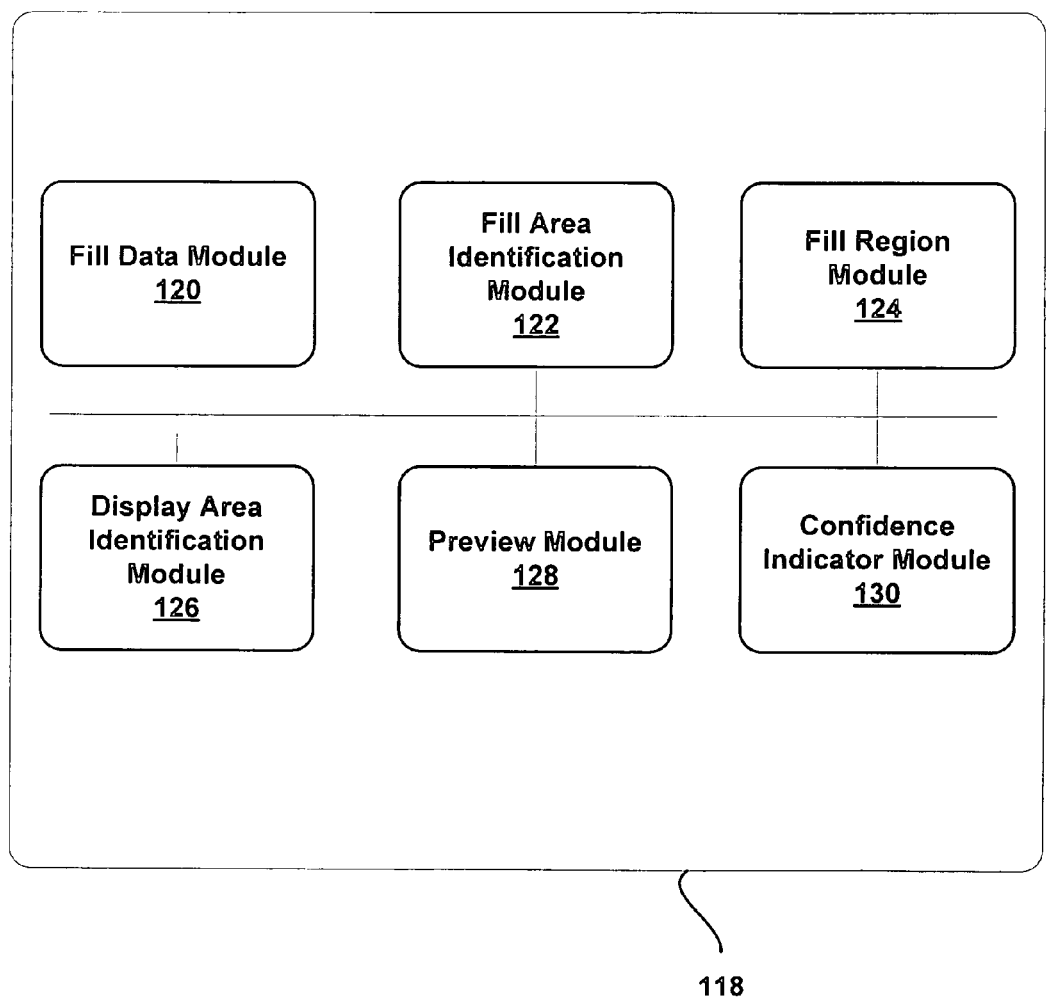
FIG. 1B illustrates a block diagram of an exemplary display control device.

Referring to FIG. 1, the media player 100 includes a display 102 for displaying information associated with media files to the user. The display 102 can be a liquid crystal display device, an EL display device, an FED (Field Emission Display) display device or other type of device. The display 102 also can include a display control device 118 operable to enhance video data being displayed, as will be described in further detail below. In the implementation shown, media player 100 also includes a processor 104 (e.g., CPU or controller), a storage device 106 (e.g., hard disk), an audio interface 108 (e.g., for interfacing with speakers), and one or more user input devices 110.

The processor 104 controls the playing of a particular media file such that, for example, upon receiving a user selection of the media file, the processor 104 accesses the storage device 106 to retrieve the selected file. Because the storage device 106 may be stored with an overwhelming number of media files, the access speed needed to retrieve the selected file can be relatively slow. Thus, to enhance the access time to the media files stored in the media player 100, a cache 112 (e.g., random access memory "RAM" or read-only memory "ROM") can be incorporated. Media files that are frequently played can be loaded into the cache 112, while other media files can be kept in the storage device 106. Alternatively, processor 104 can allow media files to be accessed using a network connection from a remote location (e.g., local area network, wireless network, Internet, intranet, etc). For example, a user can wirelessly assess and select a media file stored in the storage device 106 of the media player 100 to play the selected media file.

In some implementations, one or more network interfaces 114 also can be implemented to provide Ethernet connection to the Internet, or supply a connection bridge to other media players or media content sources. One or more of these components is coupled to one or more buses 116 (e.g., USB, FireWire, etc.).

Generally, the processor 104 serves to execute application software that controls the operation of the media player 100. The processor 104 performs basic tasks, including but not limited to: recognizing user input from the input device 110; sending media files to the display 102 and audio interface 108; keeping track of media files and directories stored in the storage device 106; controlling external peripheral devices; and managing traffic on the one or more buses 116. The processor 104 also can perform processing operations, including special effects processing associated with media files stored in the storage device, as will described in further detail below.

The storage device 106 can permanently or temporarily store video data, audio data and the like, and can provide high capacity storage capability for the media player 100. Media files stored in the storage device 106 can be retrieved by the user input device 110.

The input device 110 allows a user of the media player 100 to control and interact with the media player 100. The input device 110 can take a variety of forms, such as, but is not limited to, a button, keypad, touchpad, dial or click-wheel.

In some implementations, the input device 110 is a graphical user interface (GUI). In these implementations, the GUI provides a bridge to the stored media files for a user of the media player 100. For example, the GUI can provide a computer generated image that simulates a control panel of a hardware media player 100, and includes information generally not accessible in a hardware media player. For example, the computer generated image can include an index of media files whose content can be retrieved and executed by the media player 100. The media player 100 can be initialized when a play selection has been made by a user. When the user desires to have the media player 100 play a particular media file, the index of media files can be invoked and displayed to the user on the display 102 so that a selection can be made.

The index of media files can include an index of producers, artists, directors photographers, originators, etc. associated with the media files. The index of media files can be generated by the media player 100, for example, by reading entries of one or more directories of the storage device 106 or cache 112. Other organizational structures can be included (e.g., favorites) The media player 100 can search all such directories, and retrieve only media files having a file extension compatible with the media player 100. The retrieved media files are then displayed in the form of an index on the display 102 to prompt for user selection. If desired, the GUI can further limit the number of media files displayed on the display 102 to selected ones of the media files associated with a particular producer, artist, photographer, director, originator, etc.

A user can browse through the index of media files, and when the user desires to play a particular media file listed in the index, the GUI allows the user to simply navigate and select this media file from the index using the user input device 110.

In some implementations, the GUI can include a toggling function for switching between a window that displays the index of media files and a window that displays status information associated with a particular media file (e.g., time duration of a media file) that is selected for play by the media player 100.

In another implementations, the GUI can include a user-defined playlist. A playlist can be created by a user, and selected one(s) of the media files can be added to the playlist through the GUI. Media files defined in the playlist can be played without constant user interaction.

During operation, a user selects a desired media file to be played by the media player. Upon making and receiving the selected media file, the processor 104 accesses the storage device 106 or the cache 112 or network to locate the selected media file. The processor 104 retrieves the selected media file from a location in which it is stored, and plays the media file. The media file can be played almost substantially immediately following the user's selection. In some implementations, if the media file contains audio data, an encoder/decoder can be incorporated into the media player 100 to produce audio signals for audio speakers (e.g., headphones) coupled to the audio interface 108. The speakers can either be internal to the media player 100 or be provided as a separate unit to the media player 100.

Aspect Ratio Overview

Figure 2:
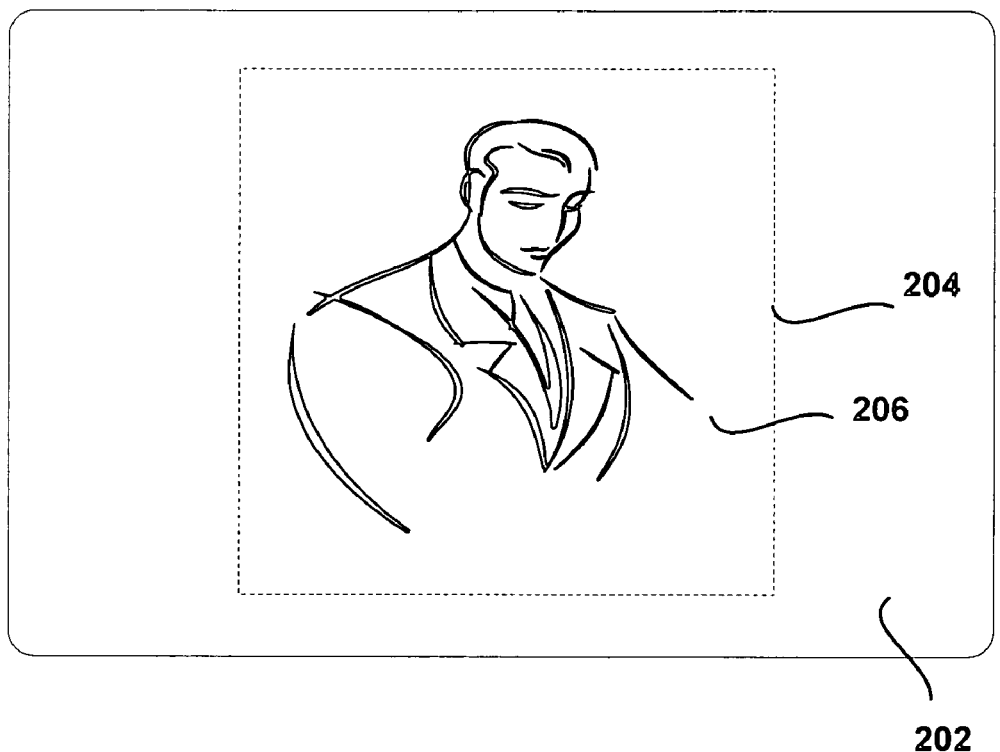
FIG. 2 illustrates an exemplary display associated with the media player of FIG. 1.

As discussed previously, the media player 100 can store and play media files stored in the storage device 106 or from other locations. In some implementations, media files include video content, such as, but is not limited to, video clips and movies. Generally, video content includes one or more consecutive frames of video and/or image data, and can be displayed to a user of the media player 100 on a display 102. FIG. 2 illustrates an exemplary display 200.

Referring to FIG. 2, the display 200 includes a display space 202 for displaying video content 206. The display 200 also defines a specific display area 204 for displaying the executed video content 206.

As discussed above, video content can be formatted and optimized in a manner that suits a particular type of display used to display the video content. For example, video content containing video and audio data can be formatted and optimized based on an aspect ratio of the display. The aspect ratio defines the relationship between a dimensional width and a dimensional height (or horizontal dimension and vertical dimension) of the display area 204 in which video content 206 is to be displayed. Conventionally, video content can be formatted according to a 4:3 aspect ratio, also commonly known as the "full screen" ratio. In the 4:3 aspect ratio, the display height is 75% less than the display width of the video content (i.e., 1.33 times greater in width than height). Alternatively, video content can be formatted according to a 16:9 aspect ratio, also commonly known as the "widescreen" ratio. In the 16:9 aspect ratio, the display width of the video content is 1.78 times greater than the display height. Video displays such as televisions generally have an aspect ratio of 4:3 or 16:9.

When the video content is produced, the type and the aspect ratio of a display being used to display the video content may not be immediately known. Even if this information is known, the video content generally can only be optimized to suit one type of display (e.g., 4:3 aspect ratio display or 16:9 aspect ratio display). In order to display video content of a certain aspect ratio on a video display with an incompatible aspect ratio, various methods including letterboxing and pillarboxing techniques are used to provide such a capability, as will be described in further detail below.

Letterboxing Overview

A typical framework for a display space generally includes a display area for displaying image frames and a non-content area. Image frames collectively represent a number of scenes, and each image frame can contain one or more graphical images. Image frames are ordered according to the temporal position of the scenes they represent in a video sequence. By taking a rapid sequence of the frames and displaying the frames at a same rate at which they were recorded, the motion that forms the basis of the image frames can be produced.

To accommodate an image frame having an aspect ratio higher than the aspect ratio of a display, a letterboxing format can be used. In the letterboxing format, a high aspect ratio image frame is displayed across the full width of a lower aspect ratio video display. Because the image frame occupies less than the available display area of the display, portions of the display space (namely, the non-content area) of the display are blank. The blank areas can be covered with black bands, as will be explained in reference to FIG. 3, to provide a theatrical effect of the video content.

Figure 3:
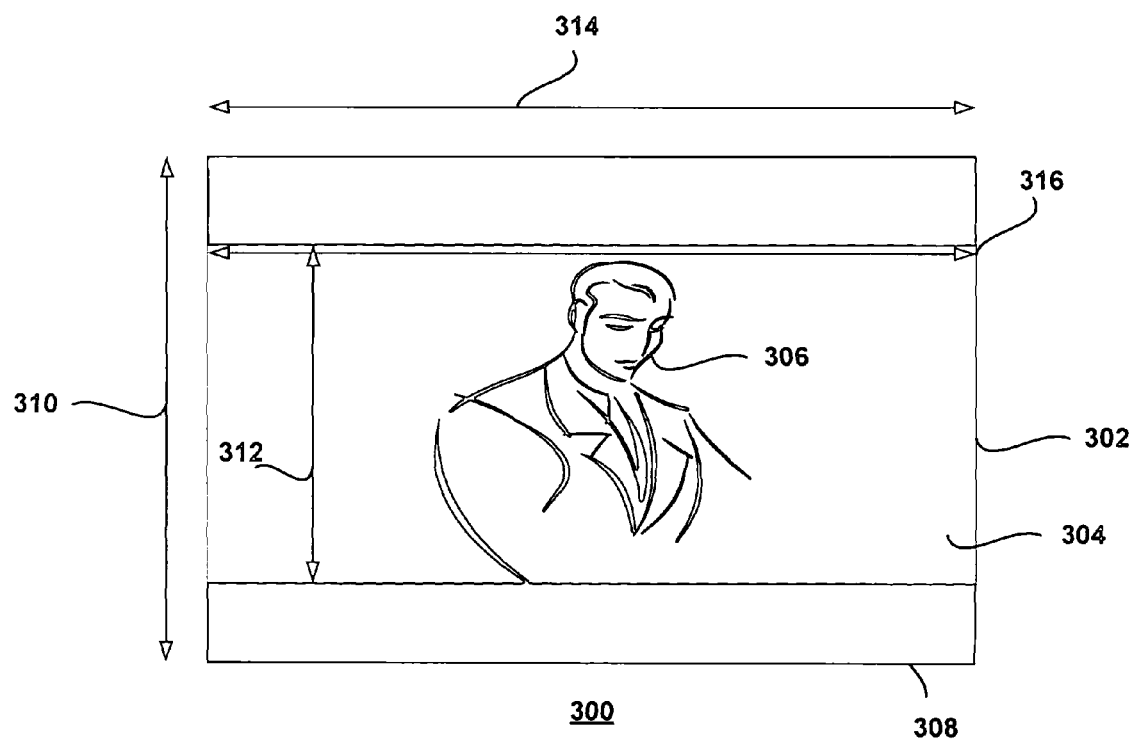
FIG. 3 illustrates an exemplary letterboxing format for displaying a video image optimized for a 16:9 aspect ratio when displayed on a 4:3 aspect ratio display.

FIG. 3 illustrates a letterboxing format for displaying an image frame optimized for a 16:9 aspect ratio display on a 4:3 aspect ratio display.

Referring to FIG. 3, a 4:3 aspect ratio display 300 is shown. An image frame 306 optimized for a 16:9 aspect ratio display is visually displayed in a display area 304 of the display 300. As shown, while the dimensional width 314 of the display 300 is substantially the same as the dimensional width 316 of the display area 304, the dimensional height 312 of the display area 304 is shorter than the dimensional height 310 of the display 300.

Due to a difference in aspect ratio between the video image 306 and the video display 300, the video image 306 cannot fully occupy every pixel available in the display space 302 available in the display 300. As shown, regions 308 located at the top and the bottom of the display space 302 are vacated, and a pair of horizontal bands, called mattes, are placed over these non-content regions. The thickness of the mattes may depend on the display aspect ratio intended by the image frame 306. For example, an image frame optimized for a 1.85:1 aspect ratio display but shown using a 4:3 aspect ratio display has thinner mattes than an image frame optimized for a 2.4:1 aspect ratio display but shown using a same display (e.g., 72% display area and 28% unused regions in the former compared to 56% display area and 44% unused regions in the latter).

Pillarboxing Overview

Figure 4:
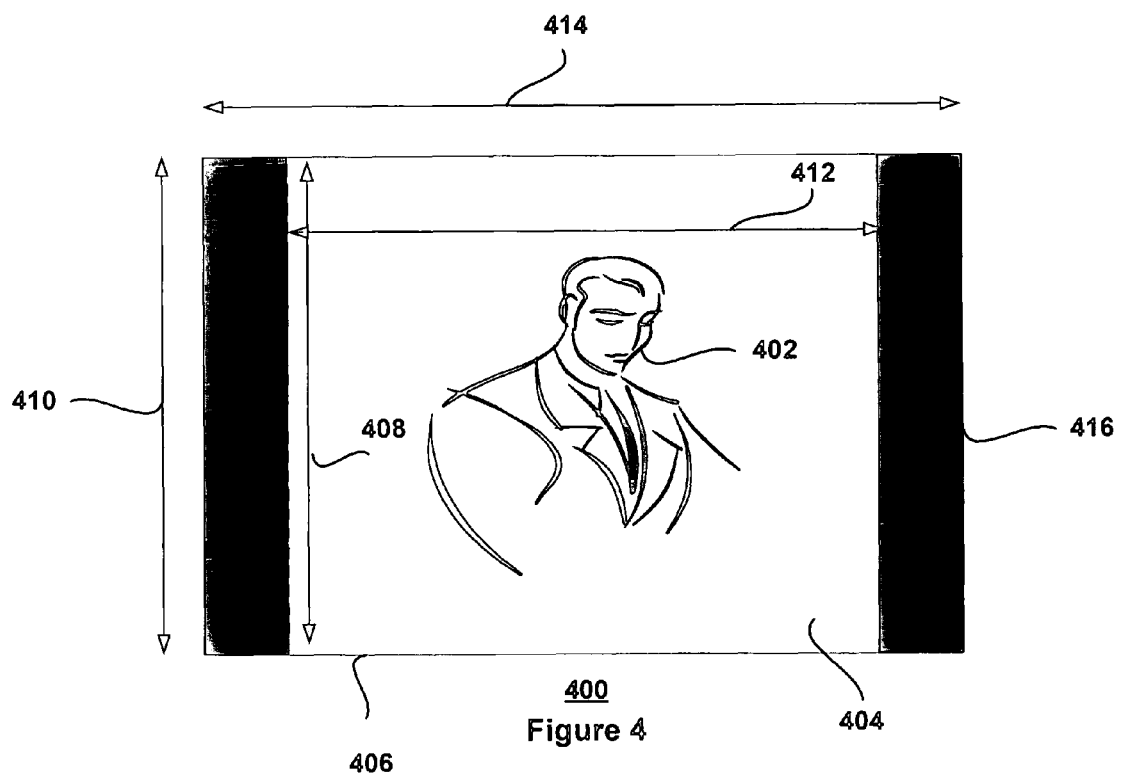
FIG. 4 illustrates an exemplary pillarboxing format for displaying a video image optimized for a 4:3 aspect ratio when displayed on a 16:9 aspect ratio display.

To accommodate an image frame optimized for a particular display having an aspect ratio lower than the aspect ratio of an actual display used to display the image frame, a pillarboxing format can be used. FIG. 4 illustrates a pillarboxing format for displaying an image frame optimized for a 4:3 aspect ratio display on a 16:9 aspect ratio display.

Referring to FIG. 4, an image frame 402 optimized for a 4:3 aspect ratio display is shown in a display area 404 of a 16:9 aspect ratio display 400. In the pillarboxing format, the dimensional height 408 of the display area 404 is the same as the dimensional height 410 of the display space 406, while the dimensional width 412 of the display area 404 is narrower than the dimensional width 414 of the display space 406.

Due to a difference in aspect ratio between the image frame 402 and the display 400, portions of the display area 404 are not used during playback. These portions are regions 416, which are non-content areas that remain blank during playback of the image frame 402.

To remove blank regions 416, conventional techniques including zooming and panning are used. Zooming allows an image frame to be zoomed to fill a display space in one or more dimensions. For example, in the pillarboxing format shown in FIG. 4, the pillarbox areas 416 are cropped, and the image frame 402 is magnified to fill the 16:9 aspect ratio display 400 (or in the letterboxing format shown in FIG. 3, the mattes 308 are cropped, and the image frame 306 is expanded to fill the 4:3 aspect ratio display 300). The image frame is stretched when horizontal zooming and vertical zooming are performed.

In this method, the dimensional width 412 of the image frame 402 is expanded horizontally to align with the edges of the 16:9 aspect ratio display 400. While this zooming technique may efficiently increase the size of image frame 402, the magnification also causes vertical dimensions of the image frame 402 to be expanded. Particularly, portions of the image frame 402 at the top and bottom of the display space 406 extend past the physical limit of the display 400 during zooming. As a result, similar to the blank regions 416, portions of the image frame 402 also are cropped during playback.

The conventional panning technique also has similar drawbacks. Referring to FIG. 3 as an example, in a panning operation, the dimensional height 312 of the image frame 306 is expanded vertically to align with the top and bottom edges of the 4:3 aspect ratio display 300. However, while portions of the image frame 306 displayed proximate to the top and bottom of the video display 300 are preserved, this expansion causes the periphery regions of the image frame 306 to extend past the physical limits of the display 300, resulting in a loss of image data near the periphery regions of the display space 302.

In addition to a loss of image data, the aforementioned techniques distort the quality of the image frame, for example, by compressing or stretching the image frame to fit the entire display area. This adversely affects the resolution of the image frame when shown on the display.

Display Control Device

Accordingly in some implementations, a display control device is used to govern the non-content (i.e., non-image)

regions (e.g., the mattes) in a display space, and selectively determine data for display in the non-content regions so as to enhance viewing experience of the image frame being displayed.

FIG. 2 illustrates exemplary components of a display control device. Referring to FIG. 2, a display control device 118 includes a fill data module 120, fill area identification module 122, fill region module 124, display area identification module 126, preview module 128 and confidence indicator module 130. The display control device 118 can be an integrated component of a media player, or alternatively, the display control device 118 can be formed as a module separate from the media player. In some implementations, the fill area identification module 122 of the display control device 118 can be configured to identify the non-content regions (e.g., mattes) in each frame. The identification process can include identifying dimensions and locations (i.e., coordinates) of the non-content regions that have no active video content. The space occupied by non-content regions can be determined after a display area is established The display area identification module 126 of the display control device 118 can function to identify this display area (i.e., content regions) used for displaying image frames.

The identification process may be followed by a determination of types of data that can be filled (hereinafter "fill data") in the non-content regions using the fill data module 120. The types of fill data can include, but are not limited to, data associated with movie enhancing effects (e.g., color information), video related information (e.g., text information such as caption, title, chapter, review, synopsis, age rating), and user provided data (e.g., clock, stock ticker, weather information and phone call identification if the display device supports video conferencing).

Once determined, the fill data can be presented in the non-content regions concurrently with the image frame. In some implementations, the fill data can accommodate frame or scene changes (e.g., as the action or a specific character moves in the image) to ensure that the fill data remains consistent and coherent with the image frame being displayed in the display area. In these implementations, fill data can be evaluated and re-evaluated in each frame to effectuate temporal consistency. Previous and subsequent frames also can be considered for enhancing fill data in a current frame.

A process 500 for presenting media is exemplarily shown in FIG. 5. Referring to FIG. 5, at step 502, property information associated with a display used to display the image frames is identified. The property information can include, but is not limited to, information associated with aspect ratio, dimensions of a display space and the like. At step 503, concurrently or sequentially, information associated with the image frames to be shown by the display including, for example, aspect ratio, language, caption or the like, is also received or identified.

Based on the identified display property information and content information, the aspect ratio of both the display and the image frames can be determined in step 504. Based on the determined aspect ratios, one or more non content display areas are identified in step 505. The process of identifying non content display areas can include computing the dimensional height and width (i.e., the size) of each non-content region. In some implementations, if the dimensional height or width of a non-content region is less than a minimum threshold, it can be assumed that either the available display space of the display is fully utilized, or that the size of the non-content region is too small to be filled with fill data that can render a sufficient visual effect. In this case, process 500 can be terminated in the current frame, and reinitiated for a next frame.

Alternatively, if the dimensional height or width of a non-content region meets the minimum threshold, the physical size (e.g., number of pixels) of the non-content region to be filled with fill data (hereinafter "fill area") is determined.

At step 506, fill data for the non-content areas is identified. Fill data can include, but is not limited to, text information, color data and the like. In implementations where fill data includes color data, the color data can be enhanced to supplement realism and visual cues of the image frame being displayed, as will be described in further detail below.

Figure 6:
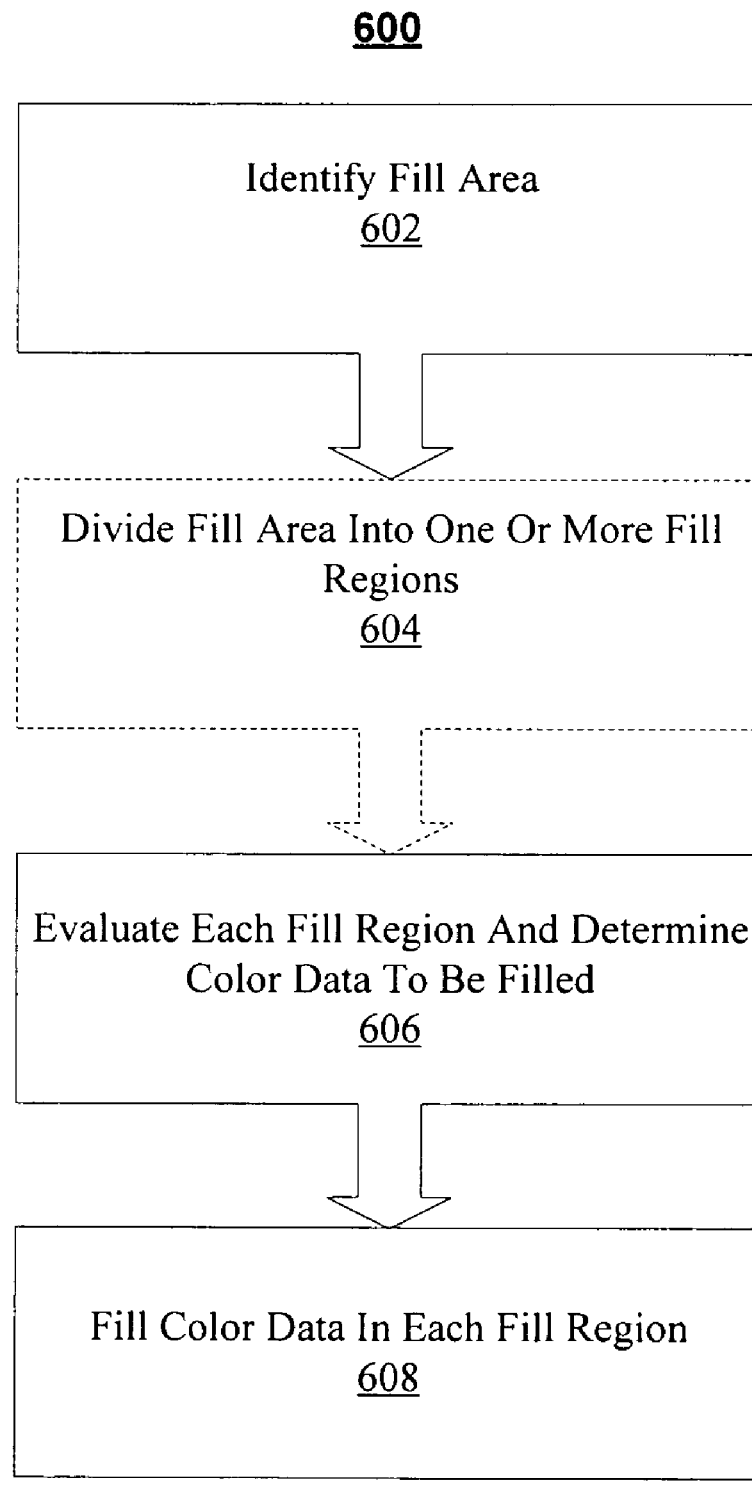
FIG. 6 illustrates an exemplary process for determining fill regions.
Figure 7:
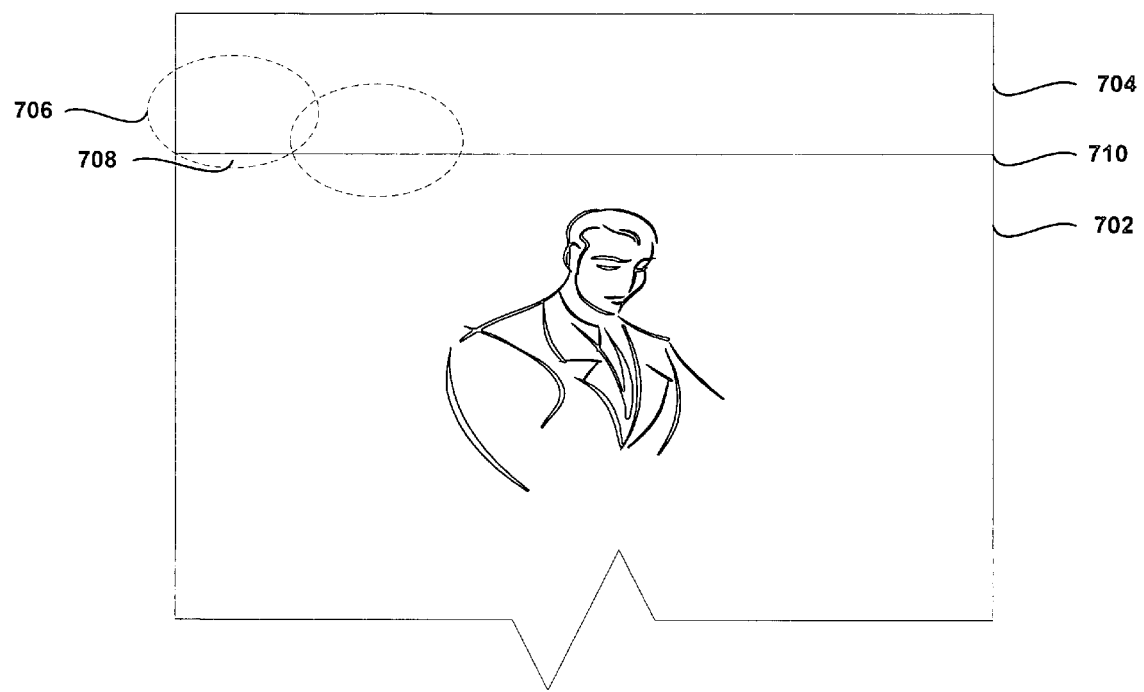
FIG. 7 illustrates an exemplary display area, fill area and fill regions associated with a display device.

FIG. 6 illustrates an exemplary process 600 for filling color data, and FIG. 7 exemplarily illustrates a display area, fill area and fill regions.

Referring to FIGS. 6 and 7, at step 600, a fill area 704 is automatically identified. The fill area 704 can be identified by a display control device based on display property information, content information or display format compatibility. For example, if it is detected that image frames are displayed in a letterboxing format, mattes such as those shown in FIG. 3 can be identified as fill area.

In some implementations, fill data is determined based on how well the display area and the fill area can be graphically merged to reduce the degree of color dissimilarity between their background color, or to minimize noticeable artifacts that may occur when they are merged. For example, if the mattes 308 shown in FIG. 3 are identified as fill areas, then fill data that can diminish the appearance of the black bands, or alternatively replace the color of the black bands, can be empirically determined.

Generally, color to be included as the fill data can be described in terms of hue (chromatic color), saturation (color purity) and brightness (light intensity). By adjusting hue, saturation and brightness in various ways, a combination of lighting effects such as, highlighted edges, shaded areas and shadows, can be added to the fill area to supplement the image frames shown in the display area. Thus, in some implementations, if it is desired that the color data to be filled in a fill area should, for example, smoothly blend the fill area into the background color shown in a display area, various degrees of hue, saturation and brightness can be employed (e.g., using RGB or CYMK model) for determining the color data.

For example, if the background color of an image frame being displayed is similar to that exhibited by a blue ocean, the display control device retrieves color data associated with the blue ocean (e.g., from fill data module 120). The retrieved color data can then be input into the fill area so as to seamlessly blend the fill area into the display area without introducing any sharp visual artifacts.

However, due to frame transition and associated changes in light illumination, fill data may not fully alleviate the problem of color discontinuity or sharp transition that occurs at the boundary (see 710 of FIG. 7) that divides the display area and the fill area. Frame-by-frame gradient operations also can give rise to strong temporal artifacts which can be noticeable during playback of the video content.

Accordingly, in some implementations, in addition to placing considerations on similarity in color between the display area and the fill area, the display control device can refine the fill data to significantly minimize undesired hard edges around the boundary or alternatively consider more than one frame (either past of future frames) when making fill data decisions. For example, the display control device can specify a particular tint and/or shade to the fill data so that the resultant colors include different colors of the same hue with varying saturation and brightness. This can be used in conjunction with color intensity and lighting variation to enhance the overall blending effect of the fill area.

In implementations in which the image frame exhibits a gradient background color, the display control device can analyze contributions of the gradients across the display area, to calculate an average color (e.g., average color histogram) exhibited by the gradient background color. The display control device can subsequently implement the average color as the fill data and perform local operations to further refine the visual effect of the fill data The visual effect can resemble a gradient texture or a texture with fading colors. For example, a gradient texture can simulate the fading of a color that begins at one edge of the fill area and ends at the opposite edge of the fill area.

In some implementations, the fill region module 124 can divide the fill area into a plurality of contiguous regions, and each region is evaluated separately to determine fill data. Again to alleviate hard edges or transitions, adjacent regions can be considered when making fill data decisions.

In some implementations, for each region of the fill area an average color is determined to individually accommodate different color transition points. If desired, the display area also can be segmented into one or more display regions. For example, to compute the average color, a color histogram associated with each display region is evaluated. Generally, each display region includes one or more pixels and each pixel displays can have an associated color or shading (e.g., grayscale). A color histogram that is representative of the colors exhibited by the pixels in a corresponding display region can be obtained by categorizing the pixels into a number of bins based on color and counting the number of the pixels in each bin. Based on the color histogram obtained from each display region, an average color histogram for a particular image frame can be calculated by, for example, summing the color histogram of each display region in the frame, and dividing the summed histogram by the number of display regions in the frame.

Although the above technique is described in relation to the regions adjacent to the boundary between the fill area and the display area, the entire display area also can be used in determining the average color exhibited by the gradient background color.

As described above, the fill area can be segmented into one or more fill regions 706 (step 604) to, for example, individually accommodate the color associated with the one or more color transition points. Fill regions 706 can overlap with other fill regions, and the fill regions 706 can collectively cover the entire or portions of the fill area 704. Each fill region 706 can be evaluated to determine fill data for a respective region (step 606). For example, color data can be determined in a manner similar to those described above (e.g., to reduce the degree of color dissimilarity between color of the fill area and background color of the image frame).

For example, if a gradient background color exhibited in a particular image frame includes a color transition from white (e.g., occupies the left region of a display area) to black (e.g., occupies the right region of a display area), the fill area can be segmented into two or more fill regions (e.g., a left fill region and a right fill region) each being assigned color data that correspond to one of the background colors (e.g., the left fill region includes light color data associated with white and the right fill region includes dark color data associated with black).

At step 608, the fill regions 706 are filled with fill data determined at step 606.

If desired, the fill data can be monitored on a continuous and ongoing basis for adaptively responding to frame/scene transition and the like. For example, fill regions can be re-segmented to accommodate different background colors exhibited in different image frames.

Figure 8A:
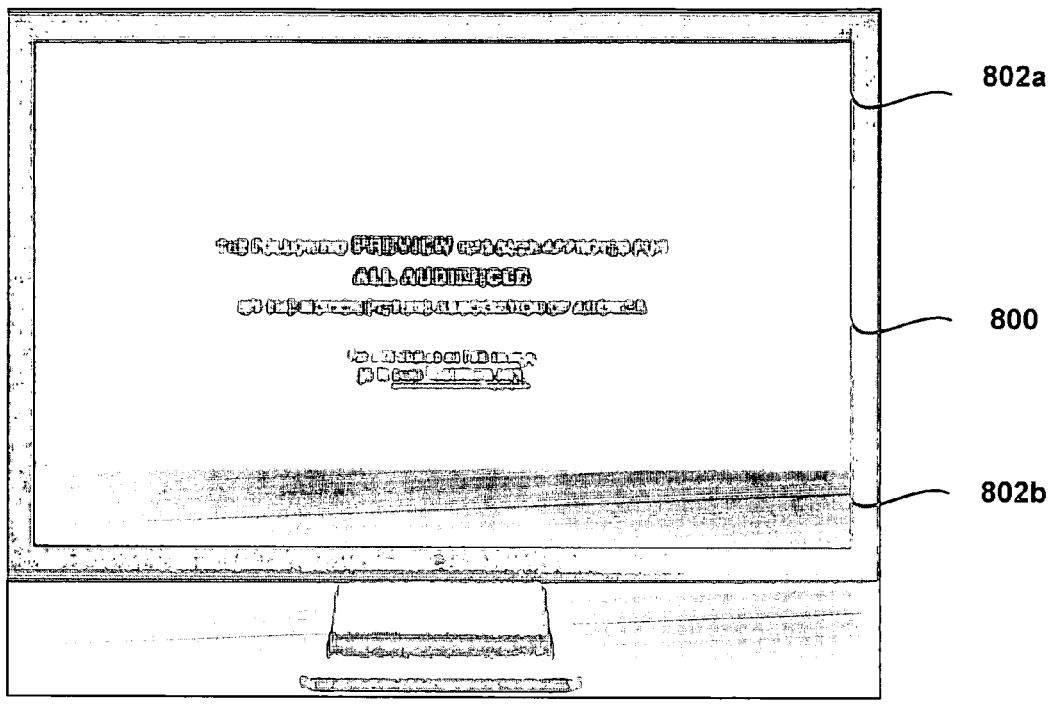
FIGS. 8A and 8B illustrate how a particular frame is affected before and after fill data has been added.
Figure 8B:
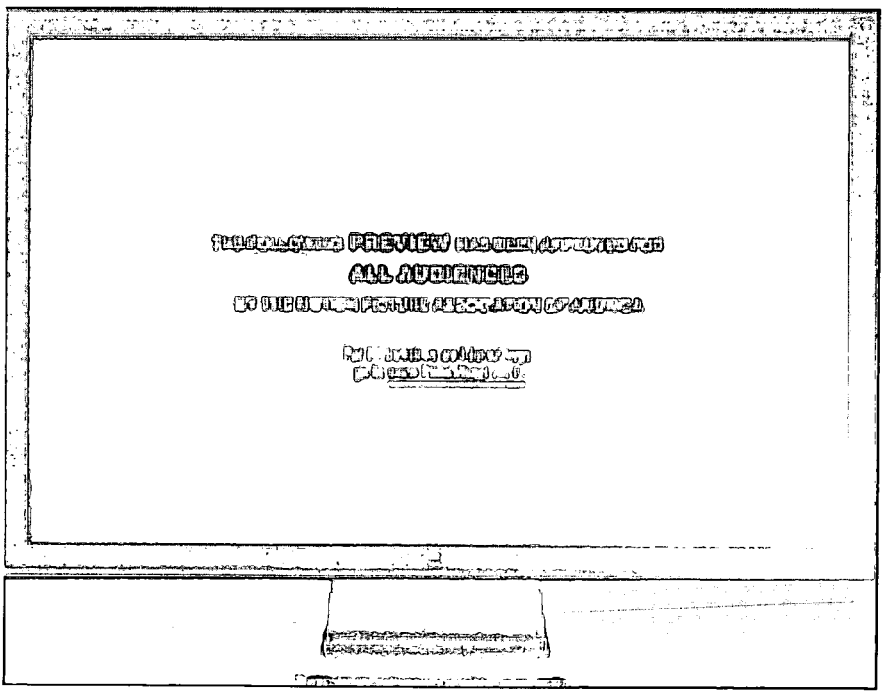

FIGS. 8A and 8B illustrate how a particular frame is affected before and after fill data has been added. Referring to FIG. 8A, a preview message 800 is shown. The preview message 800 is graphically displayed in a letterboxing format, and a pair of black horizontal mattes 802a and 802b are placed over and under the preview message 800. Using one or more of aforementioned techniques (e.g., average color histogram), fill data is determined (e.g., the background color of the preview message 800 is computed), and used to fill the horizontal mattes 802a and 802b with data that corresponds with the background color (e.g., green). The result is shown in FIG. 8B, in which the black horizontal mattes 802a and 802b are completely removed after fill data has been filled therein.

In some implementations, the fill data can be refined by using a temporal algorithm that utilizes one or more previous or subsequent images frames. For example, a set of color pixels can be collected from a first frame and a subsequent frame to determine a luminance difference between the frames. Responsive to the determined luminance difference, a suitable color data to be filled in the fill area for both frames is determined. Other color statistic, such as, but is not limited to, mean variance and entropy for each frame or differences of these values between pairs of frames also can be employed. The color data in the fill area can subsequently be adjusted for successive frames.

In another implementations, rather than using only a subset of previous and successive frames, all frames of a scene are considered when evaluating color contributions from a subset of frames and determining a suitable fill data (e.g., color) to be applied to the fill area of a current frame. For example, the process can begin with determining, for each frame, a representative value indicating the average color for the corresponding frame. The representative value for each frame is then compared and analyzed. A global or median value can be derived based on the comparison. The median value can be a value temporally medial to a first frame and a next frame that can be used in determining data (e.g., a color) that corresponds to the median value for the current frame.

If desired, a preview algorithm also can be performed using the preview module 128 so that a user can evaluate the effect of the fill data prior to being implemented in the fill area. The preview control can be implemented as a thumbnail or icon displayed along a side of a display area, or anywhere on the display space. The displayed thumbnail or icon can be transparent or semi-transparent, and the display thereof can be provided in a separate preview window. To initiate the preview control, a user can enter a preview command to a processor of a media player through a user input interface or input device to cause the media player to generate a list of one or more suitable colors. The user can navigate and select a color of interest for instant implementation.

In some implementations, the display control device may optionally include a "confidence" indicator module 130 that provides a confidence value indicator to analyze whether the visual effect expressed by the resultant fill data should be toned down or brightened up. The confidence value indicator can be assigned a confidence value on a sliding scale such as 1 to 5 (where 1 represents the highest degree of color similarity) based on the closeness of the color matching between background color of the image frame and that represented by the fill data. The confidence value can be determined based on a ratio between a median color associated with the image and the color from all pixels in the current frame. Alternatively, the confidence value can be determined based on the ratio between a median color associated with the image and colors from pixels that lie on the boundary that divides the display area and the fill area. Once a confidence value is obtained, the fill data can be enhanced to either, for example, increase or decrease its saturation based on the confidence value.

For example, if a particular frame depicts a bomb explosion, which generates mostly a white flash across the image frame, the fill data can include a substantially white color. In this case, the confidence number can be a high value, enabling the display control device to completely remove and replace the mattes with a solid and bright white color.

The confidence number also can be based on a ratio of the background color to all other colors in the frame. For example, the background color shown in the preview message of FIG. 8A is green and the color of the text is black. The ratio of green color that occupies the frame is higher than that occupied by black color. Accordingly, the confidence number can be assigned a high value in this example, enabling the display control device to completely remove and replace the mattes with a solid and bright green color.

Conversely, in a frame that depicts a human crowd, no singular color is dominant. Thus, the confidence number can be assigned a low number, indicating that the display control device can optionally refine the fill data to reflect a toned-down effect.

In some implementations, the user may specify to the display control device a confidence threshold. When a confidence threshold is specified, a confidence number with a value equal to or lower than the confidence threshold would require the display control device to re-evaluate the background of the particular frame so as to adjust the overall effect of the fill data.

If suitable color data is found, a verification refinement process can be established to assure that the color data does not create effects of sharp transitions, hard edges or noticeable artifacts, unless the process has obtained a high confidence value suggesting that the effects are desirable.

The invention and all of the functional operations described herein can be implemented in digital electronic circuitry, or in computer hardware, firmware, software, or in combinations of them. The invention can be implemented as a computer program product, i.e., a computer program tangibly embodied in a machine readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiment of the invention have been described. Nevertheless, it will be understood that various modifications may be made without departing from the spirit and scope of the invention. Accordingly, other embodiments are within the scope of the following claims.

What is claimed is:

1. A method comprising:
   identifying two or more regions of a display space being displayed in a current frame by a display device, each region being a non-content region;
   evaluating each non-content region separately based on display device information selected from a group of content displayed in the display space or property information associated with the display device, the property information including information associated with one of an aspect ratio of the display device or dimensions of the display space;
   determining fill data for each non-content region separately based at least in part on a gradient texture of the content; and
   providing the fill data for display in each non-content region.

2. The method of claim 1, wherein identifying two or more regions includes determining a dimensional width and a dimensional height of each non-content region, and aborting display of the fill data if one of the dimensional height or width does not meet a predetermined threshold.

3. The method of claim 1, wherein:
   identifying two or more regions includes identifying a first non-content region and a second non-content region;
   determining fill data for each non-content region separately based on the display device information includes:
      determining first fill data for the first non-content region using one or more first regions proximate to the first non-content region, and
      determining second fill data for the second non-content region using one or more second regions proximate to the second non-content region; and
   displaying the fill data in each non-content region includes displaying the first fill data in the first non-content region and the second fill data in the second non-content region.

4. The method of claim 3, wherein determining the second fill data for the second non-content region using the one or more second regions includes:
   determining one or more distinct regions that are proximate to the second non-content region with at least one distinct region being different from the one or more first regions; and determining the second fill data for the second non-content region using the one or more distinct regions.

5. The method of claim 1, wherein:
   determining the fill data includes determining a display gradient of the fill data based at least in part on the gradient texture of the content; and
   providing the fill data for display includes providing for display a fading effect in at least one of the non-content region according to the display gradient, where the fading effect begins at an edge of the non-content region and ends at an opposite edge of the non-content region.

6. The method of claim 1, wherein determining fill data for each non-content region is further based on a result of the evaluating.

7. A storage device having stored thereon instructions, which, when executed by a processor, causes the processor to perform operations comprising:
   identifying two or more regions of a display space being displayed in a current frame by a display device, each region being a non-content region;
   evaluating each non-content region separately based on display device information selected from a group of content displayed in the display space or property information associated with the display device, where the property information includes information associated with one of an aspect ratio of the display device or dimensions of the display space;
   determining fill data for each non-content region separately based at least in part on a gradient texture of the content; and
   providing the fill data for display in each non-content region.

8. The storage device of claim 7, wherein identifying two or more regions includes determining a dimensional width and a dimensional height of each non-content region, and aborting display of the fill data if one of the dimensional height or width does not meet a predetermined threshold.

9. The storage device of claim 7, wherein:
   identifying two or more regions includes identifying a first non-content region and a second non-content region;
   determining fill data for each non-content region separately based on the display device information includes:
      determining first fill data for the first non-content region using one or more first regions proximate to the first non-content region, and
      determining second fill data for the second non-content region using one or more second regions proximate to the second non-content region; and
   displaying the fill data in each non-content region includes displaying the first fill data in the first non-content region and the second fill data in the second non-content region.

10. The storage device of claim 9, wherein determining the second fill data for the second non-content region using the one or more second regions includes:
    determining one or more distinct regions that are proximate to the second non-content region with at least one distinct region being different from the one or more first regions; and
    determining the second fill data for the second non-content region using the one or more distinct regions.

11. The storage device of claim 7, wherein:
    determining the fill data includes determining a display gradient of the fill data based at least in part on the gradient texture of the content; and
    providing the fill data for display includes providing for display a fading effect in at least one of the non-content region according to the display gradient, where the fading effect begins at an edge of the non-content region and ends at an opposite edge of the non-content region.

12. The storage device of claim 7, wherein determining fill data for each non-content region is further based on a result of the evaluating.

13. A system comprising:
    one or more computers configured to perform operations comprising:
       identifying two or more regions of a display space being displayed in a current frame by a display device, each region being a non-content region;
       evaluating each non-content region separately based on display device information selected from a group of content displayed in the display space or property information associated with the display device, where the property information includes information associated with one of an aspect ratio of the display device or dimensions of the display space;
       determining fill data for each non-content region separately based at least in part on a gradient texture of the content; and
       providing the fill data for display in each non-content region.

14. The system of claim 13, wherein identifying two or more regions includes determining a dimensional width and a dimensional height of each non-content region, and aborting display of the fill data if one of the dimensional height or width does not meet a predetermined threshold.

15. The system of claim 13, wherein:
    identifying two or more regions includes identifying a first non-content region and a second non-content region;
    determining fill data for each non-content region separately based on the display device information includes:
       determining first fill data for the first non-content region using one or more first regions proximate to the first non-content region, and
       determining second fill data for the second non-content region using one or more second regions proximate to the second non-content region; and
    displaying the fill data in each non-content region includes displaying the first fill data in the first non-content region and the second fill data in the second non-content region.

16. The system of claim 15, wherein determining the second fill data for the second non-content region using the one or more second regions includes:
    determining one or more distinct regions that are proximate to the second non-content region with at least one distinct region being different from the one or more first regions; and
    determining the second fill data for the second non-content region using the one or more distinct regions.

17. The system of claim 13, wherein:
    determining the fill data includes determining a display gradient of the fill data based at least in part on the gradient texture of the content; and
    providing the fill data for display includes providing for display a fading effect in at least one of the non-content region according to the display gradient, where the fading effect begins at an edge of the non-content region and ends at an opposite edge of the non-content region.

18. The system of claim 13, wherein determining fill data for each non-content region is further based on a result of the evaluating.

* * * * *